Patented June 29, 1926.

1,590,782

UNITED STATES PATENT OFFICE.

THEODORE FRANÇOIS TESSE, OF PARIS, FRANCE, ASSIGNOR TO HIMSELF AND SOCIETE NAUTON FRERES & DE MARSAC, OF PARIS, FRANCE.

TRANSPARENT DOPE AND PROCESS FOR THE MANUFACTURE OF THE SAME.

No Drawing. Application filed June 24, 1918, Serial No. 241,686, and in France February 7, 1918.
Renewed December 5, 1923.

In my earlier applications 71,201 filed January 10, 1916; 123,640 filed October 4, 1916 (now Patent 1,521,055); 214,524 (now Patent 1,521,056) and 214,525 filed January 30, 1918; 221,089 filed March 7, 1918; and 241,685 filed concurrently herewith (now Patent 1,426,521), I have described a new dope having a basis of cellulose acetate, more particularly intended for coating the fabrics of aeroplanes, and also an improved process for the application of said dope.

The dope described in said earlier applications is composed substantially of the following substances:

(a) a dilute solution (about 8 to 9 %) of cellulose acetate in methyl acetate or in acetone solvent.

(b) a solvent having a higher boiling point, such as benzyl-alcohol, aceto-acetic ether (in the proportion of about 2 to 4 %) having as its principal function to act as an anti-roughening agent, for facilitating the formation of the coating skin.

(c) a solvent having a high boiling point having the function of a softening agent, such as triacetine, in a smaller proportion, say about 0.5 to 1.5%.

(d) a solvent having a very high boiling point (above 200° C.) which does not evaporate or at least only slightly, and serves as an agent for imparting plasticity, such as eugenol or isoeugenol, capable of being polymerized or of forming compounds with cellulose acetate. This substance serves as the "camphor substitute".

(e) inert materials (pigments, metallic powders, etc.,) in the proportion of about 2% for giving to the very flexible coating skin composed of the substances mentioned above, the power of tensioning the fabrics to which it is applied.

In the aforesaid earlier cases, has been also described an improved process for applying the said flexible coating skin, which consists in imprisoning the said skin between two layers of rigid and non-plastic composition having a basis of cellulose acetate.

In the dope specified hereinabove the inert materials are intended, in addition to their action as tensioning agents, to produce aesthetic and colouring effects, more particularly for "camouflaging" the fabrics of aeroplanes for military purposes.

Owing to the presence of those inert materials in the composition of the dope, the latter is rendered opaque, whereas in certain cases it may be of advantage to enable the fabrics to retain their natural appearance by employing transparent dopes.

The present invention has for its object to provide an improved transparent dope. The invention consists in the use, in the composition of the dope as specified hereinabove, of special substances as inert materials having the function of acting as tensioning agents, said special substances having the property of enabling the dope to retain its transparent nature in such a manner that it will not change the natural appearance of the fabric coated with it.

The present invention consists in the use, as inert materials, of oxides and hydroxides of the earth metals, more particularly of aluminium hydroxide produced in a special manner.

This aluminium hydroxide (hydrated oxid) is produced by treating aluminium sulphate, containing no iron, with crystallized sodium carbonate, the resulting precipitate being aluminium hydroxide $Al_2(OH)_6$.

In this reaction the sodium carbonate must be slightly in excess because if any undecomposed aluminium sulphate were to remain over, the latter might produce crystalline compounds in the presence of the hydroxide, and form a granular substance difficult to crush to powder.

Moreover, the reaction must be effected with solutions of about 10% strength, and at a temperature of about 50° C. The degree of concentration and the temperature at which the operation is to be effected constitute two important conditions, because on the one hand if concentrated boiling solutions are employed, the precipitated aluminium hydroxide will be granular and will contain opaque horny masses, and on the other hand if cold dilute solutions are employed, the precipitated aluminium hydroxide will be very difficult to wash and to filter owing to its extreme fineness of subdivision.

The use of this aluminium hydroxide as the inert material in the composition of the flexible coating skin of the dope specified hereinabove, has the advantage of not giving any colour to the fabrics, and owing to its transparency, of allowing the said fabrics to retain their natural colour and appearance.

Instead of aluminium hydroxide there may be employed as the transparent inert material, magnesium hydroxide and magnesium oxide and also hydrated peroxide of magnesium, or silica. These substances are all either oxids or hydrated oxids, and can be generically referred to as "oxid compounds."

The application of the improved dope to fabrics, and more particularly the fabrics of aeroplanes, has the result of rendering the surfaces of such fabrics smooth and perfectly brilliant, and thus does away with the use of fatty varnishes which are so injurious to the proper maintenance of the machines.

For purposes where it is required to give any colour to fabrics or cloths, the improved dope may be coloured by a special process which, whilst giving to the said dope the desired tint, will preserve its transparency. In such a case the fabric will have the same appearance as if it had been dyed, but with the advantage that its strength has not been reduced, whereas fabrics which have been dyed always lose a considerable part of their strength.

The improved dope is coloured according to the present invention by the incorporation with the aluminum hydroxide, of extremely rich organic lakes consisting of organic dye stuffs precipitated directly upon aluminium hydroxide, which should be free from natural or artificial barium sulphate, or any other loading or filling substance, (these latter being generally opaque).

By way of example the following is one way of producing the improved coloured dope:

As the inert material in a flexible dope prepared as described in aforesaid earlier applications, there are employed 2% of aluminium hydroxide to which may be added, if desired, about 1 to 2% of a very rich transparent organic lake.

The dope thus produced (if the lake is used) gives the desired colour to the fabric and has the advantage that as above stated it is not opaque, but is on the contrary very transparent and also very light in weight.

In this specification, as in my copending cases referred to, I have mentioned cellulose acetate specifically as typical of the cellulose esters of fatty acids, these being not readily inflammable as compared with nitrocellulose which is highly inflammable, and hence less adapted for the purpose.

I claim:

1. A translucent or transparent flexible dope, suitable for application to aeroplane fabrics, containing as ingredients a product which is a solvent for cellulose esters, is a substitute for camphor and has a boiling point above 200° C., a solution of a cellulose ester, and an oxide compound of the earth metals, used as inert material, serving as a tensioning agent, such oxide compound being substantially transparent.

2. A translucent or transparent flexible dope, suitable for application to aeroplane fabrics, containing as ingredients, a product which is a solvent for cellulose esters, is a substitute for camphor and has a boiling point above 200° C., a solution of a cellulose ester, and a relatively non-opaque hydroxide of an earth metal used as inert material, serving as a tensioning agent.

3. A translucent or transparent flexible dope, suitable for application to aeroplane fabrics, containing as ingredients, a product which is a solvent for cellulose esters, is a substitute for camphor and has a boiling point above 200° C., a solution of a cellulose ester, and aluminum hydroxide used as inert material serving as a tensioning agent.

4. A translucent or transparent flexible dope, suitable for aeroplane fabrics, containing as ingredients, a product which is a solvent for cellulose esters, is a substitute for camphor and has a boiling point above 200° C., a solution of a cellulose ester, and an earth metal hydroxide capable of forming the base of a lake, used as inert material serving as a tensioning agent.

5. A translucent or transparent flexible dope suitable for aeroplane fabrics, containing as ingredients, a product which is a solvent for cellulose esters, is a substitute for camphor and has a boiling point above 200° C., a solution of a cellulose ester, and a lake containing a base of aluminum hydroxide used as inert material serving as a tensioning agent.

6. A translucent or transparent flexible dope, suitable for aeroplane fabrics, containing as ingredients, a product which is a solvent for cellulose esters, is a substitute for camphor and has a boiling point above 200° C., a solution of cellulose ester of a fatty acid, and a lake-forming hydrated oxide used as inert material serving as a tensioning agent.

7. A translucent or transparent flexible dope, suitable for aeroplane fabrics, containing as ingredients, a dilute solution of cellulose acetate, a solvent for cellulose acetate having a boiling point above 200° C., capable of serving as an anti-roughening agent, a solvent having a high boiling point and having a softening function, a solvent having a very high boiling point and having a softening function, a solvent having a very high boiling point and which does not evaporate to any substantial extent, when the dope is applied and which possesses the property of plasticifying cellulose acetate, and aluminum hydroxide used as inert material and having the function of a tensioning agent.

8. A translucent or transparent flexible dope, suitable for aeroplane fabrics, containing as ingredients, a product which is a solvent for cellulose esters, is a substitute for camphor and has a boiling point above 200° C., a solution of a cellulose ester, an oxide compound of an earth metal used as inert material serving as a tensioning agent, and an organic lake, for the coloring of the dope.

9. A translucent or transparent flexible dope, suitable for aeroplane fabrics, containing as ingredients, a product which is a solvent for cellulose esters, is a substitute for camphor, and has a boiling point above 200° C., a solution of a cellulose ester, aluminum hydroxide used as inert material serving as tensioning agent, an extremely rich organic lake incorporated with the aluminum hydroxide, the said lake having as its base aluminum hydroxide free from opaque loading or filling material.

10. A translucent or transparent flexible dope, suitable for aeroplane fabrics, containing as ingredients, a dilute solution of cellulose acetate, a solvent for cellulose acetate having a boiling point above 200° C., capable of serving as an anti-roughening agent, a solvent having a high boiling point, having a softening action on cellulose acetate, a solvent having a very high boiling point, which does not evaporate to any substantial extent, when the dope is applied and which possesses plasticizing properties similar to those of eugenol and isoeugenol, aluminum hydroxide used as inert material and serving as a tensioning agent, and an extremely rich organic lake incorporated with the said aluminum hydroxide, the said aluminum hydroxide being free from any opaque loading or filling substance.

11. A translucent or transparent flexible dope, more particularly intended for aeroplane fabrics, containing as ingredients, a dilute solution of cellulose acetate,—a solvent for cellulose acetate having a boiling point above 200° C., playing the part of an anti-roughening agent,—a solvent comprising triacetine, playing the part of a softening agent,—a solvent comprising eugenol, which serves as an agent for imparting plasticity,—and aluminum hydroxide used as inert material and having the function of a tensioning agent,—an extremely rich organic lake incorporated with the said aluminum hydroxide, the said lake having aluminum hydroxide as its base and containing no barium sulfate or any other loading or filling substance.

12. A translucent to transparent dope for coating fabric aeroplane parts and the like, comprising a solution containing a cellulose ester of a fatty acid and a plasticizing agent therefor, together with a very finely divided insoluble but not substantially opaque solid "oxid compound" capable of increasing the tensioning effect in the fabric produced in the drying of said dope thereon.

The foregoing specification of my "improved transparent dope and process for the manufacture of the same," signed by me this 22nd day of May, 1918.

THEODORE FRANÇOIS TESSE.